United States Patent [19]

McLane

[11] 4,034,662

[45] July 12, 1976

[54] COOKING APPARATUS

[76] Inventor: Jack S. McLane, 1853B Vintage Court, NW. Park Apts., Marriot, Atlanta, Ga. 30060

[21] Appl. No.: 430,066

[22] Filed: Jan. 2, 1974

Related U.S. Application Data

[63] Continuation of Ser. No. 187,972, Oct. 12, 1971, Pat. No. 3,982,476.

[51] Int. Cl.² .......................................... A47J 37/07
[52] U.S. Cl. .................... 99/445; 99/450; 126/25 A
[58] Field of Search .... 99/445, 339, 340, 446–447, 99/448–450; 126/25

[56] References Cited

U.S. PATENT DOCUMENTS

| 124,296 | 3/1872 | Smith | 99/450 X |
|---|---|---|---|
| 2,638,888 | 5/1953 | Molla | 99/339 UX |
| 2,780,215 | 2/1957 | Vacanti | 126/25 A X |
| 2,806,463 | 9/1957 | Smith | 126/25 A |
| 2,943,557 | 7/1960 | Suehlsen | 99/446 X |
| 3,455,233 | 7/1969 | Cable | 99/446 X |

FOREIGN PATENT DOCUMENTS 424,546  3/1911  France ................................ 99/445

*Primary Examiner*—Billy J. Wilhite
*Assistant Examiner*—Arthur O. Henderson
*Attorney, Agent, or Firm*—Jones, Thomas & Askew

[57] ABSTRACT

Cooking apparatus especially suited for outdoor cooking using charcoal, wood and the like for fuel. The container-like body supported on legs may be made from sheet metal and includes a special damper arrangement beneath a corrugated foraminous sheet metal meat support. Charcoal or other fuel is supported in a removable pan inside a large container smaller than the inside area defined by the body and mounted above a sheet metal damper wall in which there are two large damper openings through which air flow is adjusted by means of a manually positioned hinged damper plate. The large container has ventilation holes around the edges. The corrugated formation of the foraminous plate provides slanted surfaces and grease troughs which help control the cooking and the grease disposal. A large, hinged hood may be swung and supported out of the way and the hood has a removable shelf. A special grease guard is part of the body. Special pivoted brackets selectively retain the hood in place.

10 Claims, 7 Drawing Figures

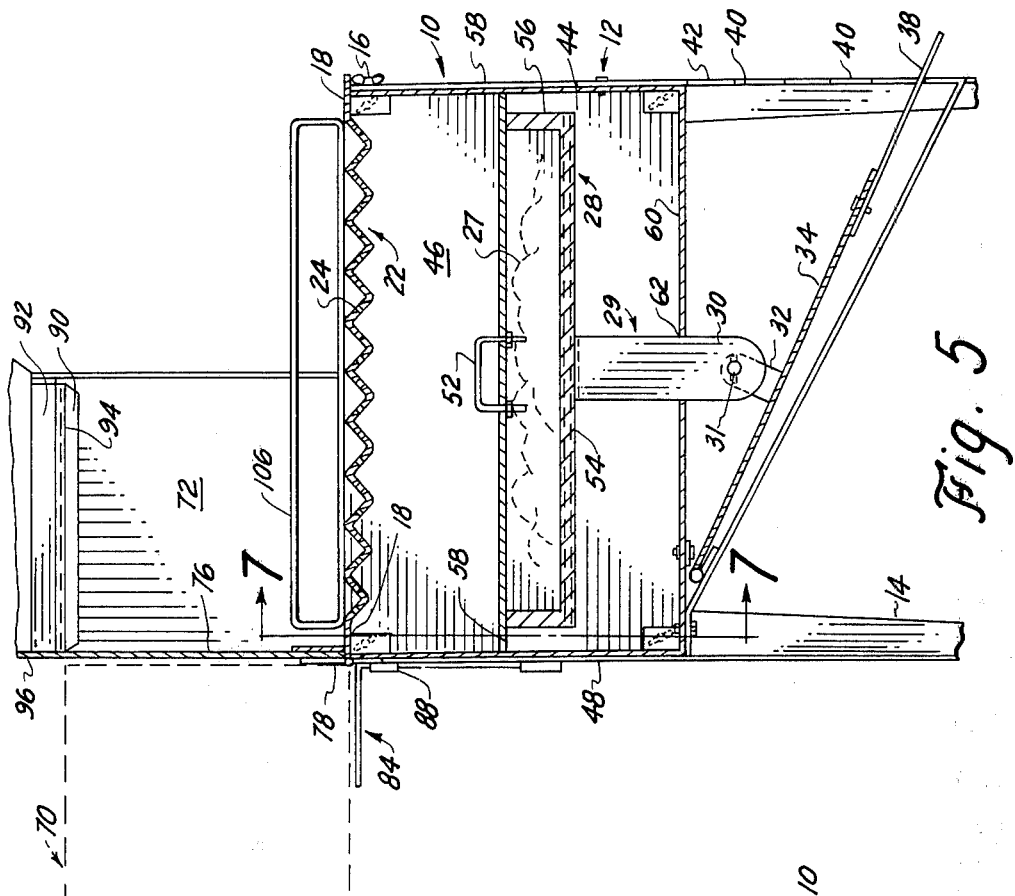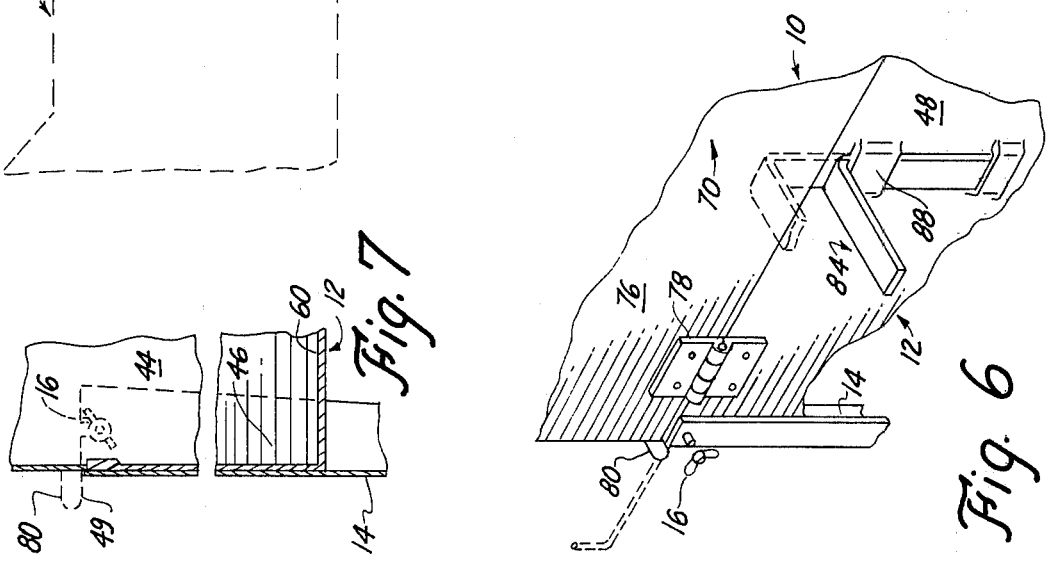

COOKING APPARATUS

CROSS REFERENCE TO RELATED APPLICATION

This is a continuation of application Ser. No. 187,972 filed Oct. 12, 1971, now U.S. Pat. No. 3,982,476, issued Sept. 28, 1976.

BACKGROUND OF THE INVENTION

1. Field of the Invention

Cooking apparatus and particularly outdoor cooking apparatus. Damper controlled cooking apparatus.

2. Description of the Prior Art

Prior art includes the following U.S. Pat. Nos.: 2,608,190; 2,656,360; 2,746,377; 2,894,448; 2,923,229; 3,035,566; 3,191,591; 3,152,591; 3,389,651; 3,478,733. Known devices for certain types of cooking have improper control of the grease disposal and the rate of cooking, that is, the proper regulation of heat on the food. It is well known that the rate of heat has a large effect on the flavor of certain cooked foods particularly fine cuts of steaks, chops and other meats, fowl and fish. Cooking too fast can spoil a good bit of the flavor. Known cooking devices cook the meat on some sort of flat surface some of which include openings and depressions but none with the grease control and cooking control obtained through the simplicity of the present device.

SUMMARY OF THE INVENTION

The problem of grease control and rate of heat is reduced through the use of the present device of the corrugated cooking platform on which the food is placed and which has slanted sides down which grease or fats run and there is also a very effective damper control beneath the cooking platform through the use of restricted openings and a bottom damper member. At the same time the entire organization of the cooking apparatus is improved and various details which aid in proper regulation of the heat. For example, the pan of fuel such as charcoal is raised or lowered by means of a manual control which also regulates the damper because the further away from the meat the more draft and the nearer to the meat the lesser amount of draft or even the damper could be closed completely, thereby providing a more inherent control without requiring so much immediate judgement on the part of the person doing the cooking.

An object of this invention is to provide a cooker for manual operation which regulates the grease and juice control from the food to the source of heat and also provides simultaneous regulation of the distance of the fuel from the food as well as the damper control when the distance is varied.

Another object of this invention resides in the particular construction of the cabinet and the damper control and other specific elements which make the device practical from a cost standpoint as well as effective from an operation standpoint.

BRIEF DESCRIPTION OF THE DRAWINGS

FIG. 5 is a cross-sectional view taken substantially along lines 5—5 in FIG. 1.

FIG. 6 is a partial perspective view of the back of the cooking device showing the hood support, and removable hinge pin.

FIG. 7 is a cross-sectional view taken along lines 7—7 in FIG. 5.

DESCRIPTION OF THE PREFERRED EMBODIMENT

Figure 1:
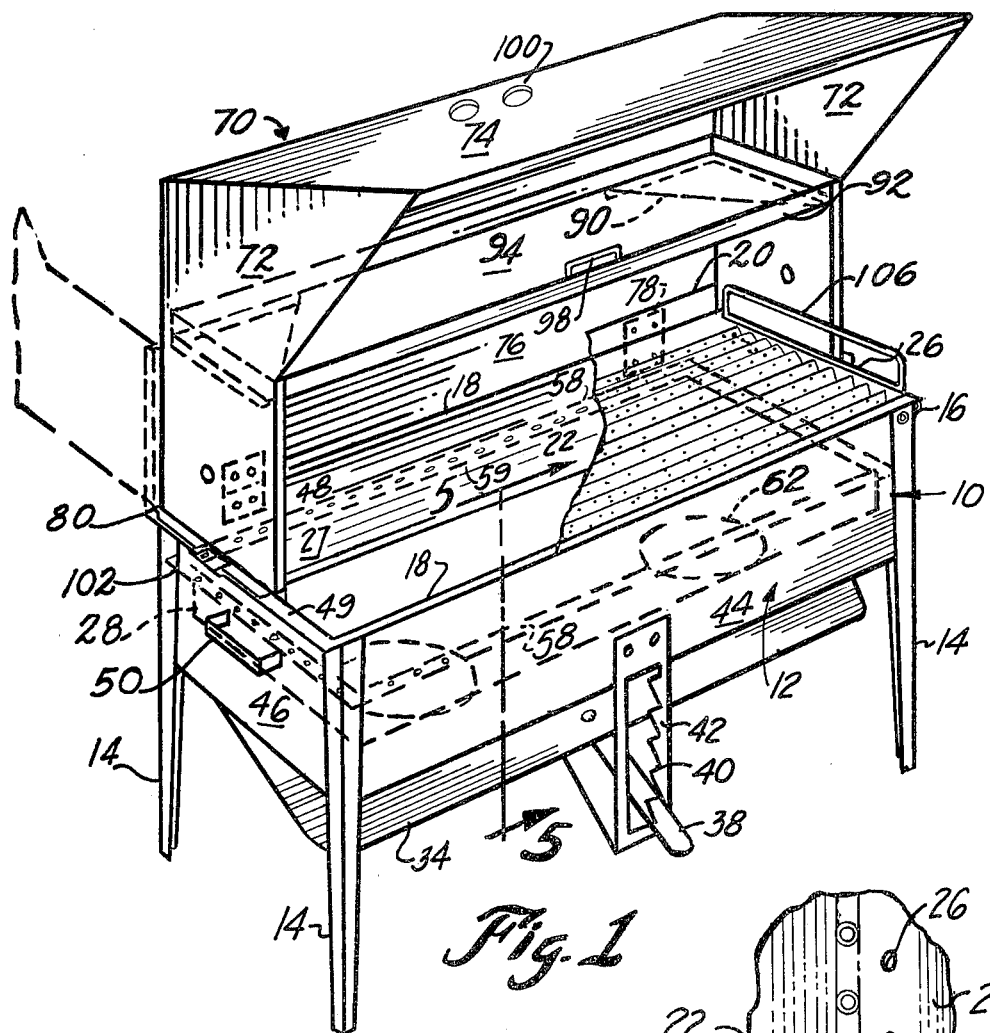
FIG. 1 is a perspective view of the present cooker with the hood in operative position.

In FIG. 1 the entire cooking apparatus is designated generally by reference numeral 10 and comprises a sheet metal body designated generally by reference numeral 12 and in the form of a large rectangular container supported on tapered sheet metal legs 14 each attached in place by means of butterfly nuts 16 at the respective corners of the body 12. Formed around the upper edge of body 12 and extending inward therefrom is a peripheral flange 18. A grease drip guard 20 seals the back edge of flange 18 with the shape shown in cross-section in FIG. 5.

Figure 2:
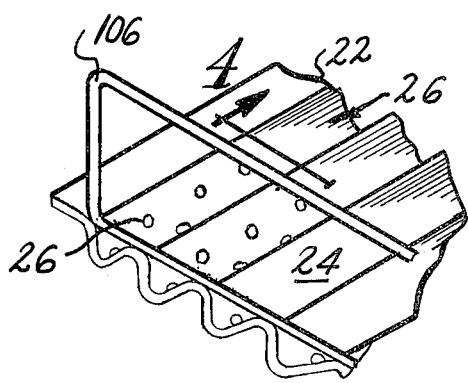
FIG. 2 is a partial perspective view showing one corner of the foraminous, corrugated food platform.
Figure 3:
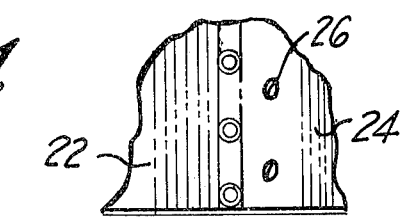
FIG. 3 is a top plan view of a portion of the food platform shown in FIG. 2, without the handle.
Figure 4:
FIG. 4 is a cross-sectional view taken substantially along lines 4—4 in FIG. 2.

Supported on an inwardly projecting ledge inside the body 12 is the food support or platform 22 which is readily seen in FIGS. 2,3,4 et al and is in the form of a foraminous corrugated sheet metal plate having longitudinal sloping surfaces 24 in random arrangement and there being so many as to make the platform 24 essentially foraminous or perforated and ventilated. Mounted within the body 12 for removal therefrom is a rectangular open-top fuel (charcoal) pan 27 supported in a container 28 on a U-shape support 29 having arms 30 pivotally mounted on a pin 31 on a projecting member 32 mounted on a movable damper plate 34 having a control arm 38 attached thereto. Arm 38 is fitted into one of several notches 40 made in an open guide plate 42 riveted to the front 44 of the body 12.

Body 12 is a type of cabinet contruction including the front 44, sides or ends 46 and a back 48. A peripheral marginal edge 49 extends from front 44, sides 46 and back 48. The ends 46 are provided with handles 50.

The charcoal pan 27 has handles 52 on the opposite ends thereof and is removably supported in the movable container 28 on the bottom 54 having sides 56 with projecting flanges 58 having air vent holes 59. Movement of the control arm 38 automatically moves the charcoal pan 27 by moving the support container 28 through the support 29 by arms 30 and at the same time moves the damper plate 34 towards or away from the bottom 60 of the body 12 which has spaced openings 62 therein. There is a support 29 thru each of the two openings 62 and therefore there are two supports 29 spaced across the length of the body 12.

The hinged upper hood is designated generally by reference numeral 70 and comprises ends 72, a top 74 and a back 76 which is hinged by hinges 78 to the back 48 of the body 12. The ends of the hood 70 have triangular formations near the upper part which makes the hood project over the corrugated food platforms 22 in the upper area but not in the lower area in the manner shown in FIG. 1. Ends 72 have projecting flanges 80 thereon which rest against the flanged edge of the body 12 and support the hood in the operative condition shown in FIG. 1. The hood 70 may be swung to an inoperative, out of the way condition shown in the dotted lines of FIG. 5 whereat it rests upon a support member 84 shown in FIG. 6 which is a bent plate inserted in slotted portion 88 formed on the back 48. Hood 70 also includes on the inside thereof inwardly projecting triangular plates 90 which support a removable tray designated generally by 92 and having a bottom 94 and an upstanding peripheral marginal edge 96 on which is mounted handles 98. The top 74 of the hood 70 has vent holes 100 therein. Hood 70 is latched at a selected position by means of clips 102 bent from metal plate in a U-shape and with a pivoted tongue whereby the U-shape fits over the flanges 80 and edge 49 to latch the hood 70 in place.

The corrugated food support 28 has long wire handles 106 mounted thereon at opposite ends thereof to assist in removing and replacing same.

While I have shown and described a particular preferred embodiment of this invention this is by way of illustration only and does not constitute any sort of limitation since there are various alterations, changes, deviations, amendments, revisions, additions, subtractions, combinings, mergers, and other departures which may be made in the embodiment shown and described without departing from the scope of the invention as defined by proper interpretation of the appended Claims.

What is claimed is:

1. A cooking apparatus operable for controlling flame flare-up in a cooking operation comprising, in combination:
   a. A pan having a recessed fuel burning area operable for supporting heat producing means;
   b. a cooking surface supported above said pan, said cooking surface including means for defining limited air flow passageways therethrough for controlling the amount of air passing through said cooking surface into the area between said pan and said cooking surface; and,
   c. housing means extending around and completely enclosing the area between said pan and said cooking surface, said housing means defining limited air passage means into said pan above said fuel burning area, and means forming the combination of said cooking surface limited air passage means and said housing limited air passage means to collectively control the amount of oxygen supplied to said fuel burning area to prevent flame flare-up.

2. A cooking apparatus as defined in claim 1 further characterized in that said cooking surface is constructed to include peaks and valleys connected by angularly oriented surfaces, with said peaks operable for supporting food to be cooked and said angularly oriented surfaces operable for controlling and limiting air flow into said area between said cooking surface and said pan.

3. A cooking apparatus as defined in claim 2 further characterized in that a plurality of openings are formed in said valleys and said angularly oriented surfaces.

4. A cooking apparatus as defined in claim 3 further characterized in that said cooking surface is formed to include a corrugated plate defining said peaks, valleys and angularly oriented surfaces.

5. A cooking apparatus as defined in claim 1 further characterized in that said housing includes means defining a plurality of openings around the periphery of said pan for controlling air flow into said area between said pan and said cooking surface.

6. A cooking apparatus as defined in claim 5 further characterized in that said housing includes horizontal flange means extending around the periphery of said pan, and wherein said plurality of openings are formed in said horizontal flange.

7. A cooking apparatus as defined in claim 6 further characterized in that said plurality of openings are detailed in location relative to said pan to introduce air flow into said area above heat producing means supported in said pan.

8. A cooking apparatus as defined in claim 1 further characterized in that said cooking apparatus includes adjustment means for adjusting said pan and said cooking surface relative to each other to vary the distance therebetween.

9. A cooking apparatus as defined in claim 8 further characterized in that said adjustment means includes means for adjusting the elevation of said pan and including means for holding said pan in selected adjusted positions.

10. A cooking apparatus as defined in claim 1 further characterized in that said cooking apparatus includes support means for supporting said cooking apparatus at a selected elevation.

* * * * *